(12) United States Patent
Yamagishi et al.

(10) Patent No.: US 8,656,306 B2
(45) Date of Patent: Feb. 18, 2014

(54) APPARATUS AND METHOD FOR DISPLAYING IMAGE

(75) Inventors: Yoshikazu Yamagishi, Nagoya (JP); Masato Matsumura, Nagoya (JP)

(73) Assignee: Buffalo Inc., Nagoya-shi, Aichi-ken (JP)

( * ) Notice: Subject to any disclaimer, the term of this patent is extended or adjusted under 35 U.S.C. 154(b) by 1811 days.

(21) Appl. No.: 11/603,611

(22) Filed: Nov. 21, 2006

(65) Prior Publication Data

US 2007/0130539 A1     Jun. 7, 2007

(30) Foreign Application Priority Data

Nov. 28, 2005   (JP) ................................. 2005-342331

(51) Int. Cl.
  *G06F 3/048*     (2013.01)

(52) U.S. Cl.
  USPC ........... 715/810; 715/815; 715/856; 715/808; 715/798; 715/792

(58) Field of Classification Search
  USPC .................. 715/810, 815, 856, 808, 798, 792
  See application file for complete search history.

(56) References Cited

U.S. PATENT DOCUMENTS 5,874,958 A *  2/1999 Ludolph ........................ 715/781
6,490,002 B1 * 12/2002 Shintani ......................... 348/569
6,654,036 B1 * 11/2003 Jones ............................. 715/798
7,149,968 B1 * 12/2006 Ackerschewski et al. .... 715/255
7,224,382 B2 *  5/2007 Baker ............................. 348/46
2003/0233656 A1 * 12/2003 Sie et al. ......................... 725/46

FOREIGN PATENT DOCUMENTS

| JP | S61-214021 A | 9/1986 |
| JP | 2002-055753 A | 2/2002 |
| JP | 2002-163057 | 6/2002 |
| JP | 2005-301131 A | 10/2005 |

OTHER PUBLICATIONS

Japanese Notice of the reason for refusal dated Jun. 22, 2010.

* cited by examiner

*Primary Examiner* — Michael Roswell
(74) *Attorney, Agent, or Firm* — Yokoi & Co., U.S.A., Inc.; Toshiyuki Yokoi

(57) ABSTRACT

An image displaying apparatus for a computer selectively executing a full-screen display or a frame display on a monitor screen is disclosed. The apparatus includes a main screen generating unit generating a predetermined main screen, a full-screen displaying unit displaying the main screen in a full-screen display, a mouse operation determining unit detecting a moving operation of the mouse to determine whether or not the moving operation is a predetermined first movement, a full-screen display detecting unit detecting whether or not the main screen is in the full-screen display, and a composite displaying unit displaying a predetermined sub-screen on the screen and the main screen downscaled so that the whole main screen is displayed on the remaining range of the screen when the mouse operation determining unit determines, during the full-screen display, that the moving operation is the first movement.

22 Claims, 9 Drawing Sheets

| SPECIFIED RANGE | PRIORITY | CURSOR LOCATION | DISPLAYED MENU | DISPLAY LOCATION |
|---|---|---|---|---|
| 1 | 1 | (x10,y10)-(x11,y11) | MENU 1 | LOWER END |
| 2 | 2 | (x20,y20)-(x21,y21) | MENU 2 | RIGHT END |
| 3 | 3 | (x30,y30)-(x31,y31) | MENU 3 | UPPER END |
| 4 | 4 | (x40,y40)-(x41,y41) | MENU 4 | LEFT END |

APPARATUS AND METHOD FOR DISPLAYING IMAGE

CROSS-REFERENCE TO RELATED APPLICATIONS

The present application is related to the Japanese Patent Application No. 2005-342331, filed on Nov. 28, 2005, the entire disclosure of which is expressly incorporated by reference herein.

BACKGROUND OF THE INVENTION (1) Field of the Invention

The present invention relates to an apparatus and method for displaying images, and more particularly, to an apparatus and method for displaying images on a computer, including a medium on which an image display program is recorded.

(2) Description of the Related Art

Computers have conventionally been capable of accepting operation of a mouse and carrying out display of various types of data. Computers are capable of selectively executing, as display modes, a full-screen display or a frame display. In the full-screen display, original screen information generated by an application or the like is displayed using an entire screen area of a monitor, and other frames are not displayed especially. On the other hand, a frame is formed on the periphery of a screen formed in the above-described manner in the frame display so that the screen is displayed with the frame, and a plurality of frame screens are displayed on a screen area of the monitor in a superposed manner. Furthermore, the frame is formed with an operation area so as to be operable.

A capture board has recently been connected to computers so that the computers receive television programs to display screens of television program on the monitor or to convert the television programs to video files and record the video files. In the frame display, a television program screen and a screen of operation area are individually displayed on a screen region of the monitor. A program list for television or a setting operation panel for a plurality of capture boards may be displayed in the operation area.

On the other hand, when a television program is displayed in the full-screen display, the screen becomes as close as to television and accordingly, the viewer can view the program with a sense different from one he or she obtains when operating a computer, whereby satisfaction can be increased. However, other operating areas cannot be displayed while display is in the full-screen display. There are two methods to effect another operation. Firstly, the display apparatus is once returned to the frame display and then, the corresponding operation in the frame with the displayed operating area. This case necessitates two operations, that is, an operation for returning to the frame display and an operation for cleaning up framed screens placed on screen areas of the monitor so that all the necessary operating areas are displayed when the framed screens are superimposed. JP-2002-163057A discloses a screen in the use of an ordinary application as a technique to adjust a plurality of framed screens.

Secondly, the right mouse button is clicked under the full-screen display and with this, submenus are popped up and traced so that a necessary operating area is displayed or hierarchy is raced through and thereafter, the necessary operation is completed. In this case, the operation for selecting a necessary operating area is necessitated in addition to the initial click of the right mouse button.

Both of the above-described methods require a plurality of steps to be taken. Accordingly, erroneous steps are apt to be selected. Furthermore, upon completion of such an operation, another operation is required to return to an original screen, resulting in troubles. Furthermore, a part of the original screen is hidden when a plurality of framed screens are superimposed or a submenu is displayed on the full-screen. Consequently, there is a risk that an important screen may be overlooked.

BRIEF SUMMARY OF THE INVENTION

The present invention discloses an image displaying apparatus and method for a computer, in each of which an important part of original screen can be prevented from being overlooked while the number of operations can be reduced, and a medium on which such an image displaying program is recorded.

One aspect of the present invention provides an image displaying apparatus for a computer which is capable of accepting an operation of a mouse and selectively executing a full-screen display or a frame display on a screen of a monitor, the apparatus comprising: a main screen generating unit which generates a predetermined main screen; a full-screen displaying unit which displays the main screen in the full-screen display; a first mouse operation determining unit which detects a moving operation of the mouse to determine whether or not the moving operation is a predetermined first movement; a full-screen display detecting unit which detects whether or not the main screen is in the full-screen display; and a composite displaying unit which displays a predetermined sub-screen on the screen and the main screen which is downscaled so that the whole main screen is displayed on the remaining range of the screen when the first mouse operation determining unit determines, during the full-screen display, that the moving operation is the first movement.

In the above-described image displaying apparatus, the predetermined main screen is generated by the main screen generating unit and then displayed in the full-screen display by the full-screen displaying unit. On the other hand, a mouse operation determining unit detects a moving operation of the mouse to determine whether or not the moving operation is a predetermined first movement. In parallel with this, the full-screen display detecting unit detects whether or not the main screen is in the full-screen display. When the main screen generating unit detects during the full-screen display that the moving operation is the first moving operation, the composite displaying unit displays the predetermined sub-screen on the screen and displays the predetermined sub-screen on the screen and the main screen which is downscaled so that the whole main screen is displayed on the remaining range of the screen.

The main screen is downscaled but not hidden while the sub-screen is displayed in synchronization with the moving operation of the mouse. Accordingly, a predetermined operation screen can be displayed without excess operation such as button click of the mouse. Furthermore, since the main screen is downscaled and can be prevented from being hidden, an important screen can be prevented from being overlooked.

An optional aspect of the present invention provides the apparatus, wherein the composite displaying unit further includes: a composite display detecting unit which detects whether or not the sub-screen is under a composite display in addition to the main screen; a second mouse operation determining unit which detects a moving operation of the mouse to determine whether or not the moving operation is a predetermined second movement; and a full-screen return control unit which controls the full-screen display detecting unit so that the main screen is displayed in the full screen display when the second mouse operation determining unit determines, during the composite display, that the moving operation is the second movement.

In the above-described image displaying apparatus, the composite display detecting unit detects whether or not the sub-screen is in the composite display in which the sub-screen is displayed in addition to the main screen. The second mouse operation determining unit detects the moving operation of the mouse to determine whether or not the moving operation is the predetermined second movement. When it is determined, during the composite display, that the moving operation is the second movement, the full-screen return control unit controls the full-screen display detecting unit so that the main screen is displayed in the full-screen display. Thus, since the screen is returned to the main screen in the full-screen display only by the movement of the mouse, the returning operation is simplified.

Another optional aspect of the present invention provides the apparatus, wherein each mouse operation determining unit has an obtaining unit which obtains a predetermined plurality of pieces of location information and a current location of a mouse cursor with a moving operation of the mouse, thereby determining whether or not the obtained current location of the mouse cursor corresponds with each location information.

In the above-described image displaying apparatus, the obtaining unit previously obtains the predetermined plurality of pieces of locational information triggering display of the sub-screen. The current location of the mouse cursor with the moving operation of the mouse is obtained. It is determined whether or not the obtained current location corresponds with each piece of locational information. Consequently, the moving operation can easily be determined.

Another optional aspect of the present invention provides the apparatus, wherein the screen has four sides and the moving operation of the mouse is a movement of the mouse to a location near to any one of the sides of the screen.

In the above-described image displaying apparatus, when the mouse is operated so as to be moved to the location near to one of the sides of the screen, this movement is determined to be the first movement, whereupon the screen is turned to the composite screen display. In this case, the movement to the location near to one of the four sides may be determined on the basis of the current location after the movement or the moving direction may be determined on the basis of movement process. When being the one toward one of the four sides, the movement may be determined to be the movement to the location near to one of the sides. Consequently, since the movement to the location near to the four sides of the screen is determined, the operation can be simplified.

Another optional aspect of the present invention provides the apparatus, wherein when the first movement is a movement near to a location where two of the sides of the screen are in contact with each other, priority is given to either one of the two sides.

In the above-described image displaying apparatus, priority is given to either one of the two sides when the first movement is a movement near to the location where two of the sides of the screen are in contact with each other. For example, in the case of movement toward a lower right corner of the screen, the movement is determined to be a movement approaching the right side of the screen or a lower part of the screen. In this case, if the operation of the sub-screen with movement toward the lower part is more frequent, priority is given so that the predetermined movement is a movement to the lower side. Consequently, when the predetermined movement is the movement near to a location where two of the sides of the screen are in contact with each other, priority is given to either one of two sides, whereupon the operation can be prevented from being susceptible to failure.

Another optional aspect of the present invention provides the apparatus, wherein the composite displaying unit displays other sub-screens corresponding to the four sides of the screen.

In the above-described image displaying apparatus, the screen has four sides and the composite displaying unit displays different sub-screens corresponding to the four sides on the basis of the operation of the mouse. Consequently, the different sub-screens whose number is up to four and correspond to the four sides of the screen can intuitively be operated and accordingly, the operation can be simplified.

Another optional aspect of the present invention provides the apparatus, wherein the composite displaying unit displays the sub-screen at a location near to any one of the sides of the screen, detects a length and a breadth of a remaining area and computes a reduced size which can display largest while an aspect ratio of the main screen remains unchanged and displays the remaining area with a reduced size as large as possible, displaying the screen with the reduced size with right, left, upper and lower remaining parts being substantially uniformed.

In the above-described image displaying apparatus, the composite displaying unit displays the sub-screen at a location near to any one of the sides of the screen. In this case, the composite displaying unit detects the length and the breadth of the remaining area and computes the reduced size which can display largest while the aspect ratio of the main screen remains unchanged and displays the remaining area with the reduced size as large as possible, displaying the screen with the reduced size with right, left, upper and lower remaining parts being substantially uniformed. The remaining area of the screen can be displayed in the central part largest while the sub-screen is displayed at a location near any one of the sides of the screen. Consequently, the display area can be prevented from being wasted.

Another optional aspect of the present invention provides the apparatus, wherein the main screen generating unit receives television broadcast to generate a television broadcast screen Another optional aspect of the present invention provides the apparatus, wherein the composite displaying unit generates a sub-menu screen concerning watching of the television broadcast as the sub-screen. Consequently, the sub-menu screen with respect to the television watching can intuitively be operated.

Another optional aspect of the present invention provides the apparatus, wherein the sub-menu displays a television program list and accepts a video recording reservation. Consequently, the program list can be displayed and the video recording reservation can be accepted.

Another optional aspect of the present invention provides the apparatus, wherein the first movement is a downward movement of the screen and the sub-menu is displayed on a lower part of the screen. When the mouse is operated so as to be moved to the lower part of the screen, the movement is determined to be the aforesaid predetermined movement and the sub-menu is displayed on the lower part of the screen which is an end of the screen on which the cursor has been moved by the operation of the mouse.

Furthermore, in the above-described image displaying apparatus, when the mouse is operated so that the cursor is moved downward, the program list can be displayed.

Another optional aspect of the present invention provides the apparatus, wherein the main screen generating unit comprises a plurality of capture boards individually receiving television broadcast. Thus, the capture boards are individually provided for receiving television programs. Each of the individual screens based on the television broadcast is generated as the main screen. Consequently, television broadcast can be received by the individual capture boards.

Another optional aspect of the present invention provides the apparatus, wherein the sub-menu displays information about the capture boards and accepts a setting operation of each capture board. In this construction, a plurality of capture boards are provided and accordingly, individual settings are necessitated for the capture boards. In view of this, the sub-menu displays information about the capture boards and accepts a setting operation of each capture board.

Another optional aspect of the present invention provides the apparatus, wherein the first movement is a rightward movement of the screen and the sub-menu is displayed on a right part of the screen. In this construction, when the mouse is operated so as to be moved to the right of the screen, the movement is determined to be the first movement and the sub-menu is displayed on the right of the screen. Consequently, the information about the capture boards can be displayed when the mouse is operated so as to be moved to the right of the screen or an end of the screen for which the mouse has been operated.

Another optional aspect of the present invention provides the apparatus, wherein the sub-menu displays a still image of television broadcast received by each of a plurality of capture boards. Consequently, the still image of television broadcast received by the capture boards can be displayed.

Another optional aspect of the present invention provides the apparatus, wherein the first movement is a leftward movement of the screen and the sub-menu is displayed on a left part of the screen. When the mouse is operated so as to be moved leftward, the movement is determined to be the first movement and the sub-menu is displayed on the left of the screen. Consequently, the information about the capture boards can be displayed when the mouse is operated so that the cursor is moved to the left of the screen or an end of the screen for which the mouse has been operated.

Another optional aspect of the present invention provides the apparatus, wherein the sub-menu is capable of accepting a color tone adjusting operation of the main screen.

Another optional aspect of the present invention provides the apparatus, wherein the first movement is an upward movement with respect to the screen and the sub-menu is displayed on an upper part of the screen. When the mouse is operated so that the screen is moved toward an upper part thereof, the movement is determined to be the first movement. The sub-menu is displayed on the upper part of the main screen for which the mouse has been operated.

Another aspect of the present invention provides an image displaying method for a computer which is capable of accepting an operation of a mouse and selectively executing a full-screen display or a frame display on a screen of a monitor, the method comprising: generating a predetermined main screen; displaying the main screen in a full-screen display; detecting a moving operation of the mouse to determine whether or not the moving operation is a predetermined first movement; detecting whether or not the main screen is in the full-screen display; and displaying a predetermined sub-screen on the screen and the main screen which is downscaled so that the whole main screen is displayed on the remaining range of the screen when it is determined, during the full-screen display, that the moving operation is the first movement.

Another optional aspect of the present invention provides the method, further comprising: detecting whether or not the sub-screen is in a composite display mode in addition to the main screen; detecting a moving operation of the mouse to determine whether or not the moving operation is a predetermined second movement; and displaying the main screen in the full-screen display when it is determined, during the composite display, that the moving operation is the second movement.

The present invention can provide the image displaying method which can achieve the same effect as by the foregoing image displaying apparatus for the computer. Thus, the invention should not be limited to a substantial apparatus but is effective as a method.

The above-described image displaying apparatus for the computer sometimes exists as a single entity and is sometimes built in an apparatus or device in use. Thus, the invention may include various forms. Accordingly, the invention may be applied to software or hardware and thus can be changed suitably When the invention is software for an image displaying apparatus for a computer as one embodiment thereof, a recording medium on which the software is recorded exists and is used. As an example, another aspect of the present invention provides a medium on which an image displaying program for a computer is recorded, the computer being capable of accepting an operation of a mouse and selectively executing a full-screen display or a frame display on a screen of a monitor, the program comprising the functions of generating a predetermined main screen, displaying the main screen in a full-screen display, detecting a moving operation of the mouse to determine whether or not the moving operation is a predetermined first movement, detecting whether or not the main screen is in the full-screen display, and displaying a predetermined sub-screen on the screen and the main screen which is downscaled so that the whole main screen is displayed on the remaining range of the screen when it is determined, during the full-screen display, that the moving operation is the first movement.

Another optional aspect of the present invention provides the medium, wherein the program further comprises the functions of: detecting whether or not the sub-screen is in a composite display in addition to the main screen; detecting a moving operation of the mouse to determine whether or not the moving operation is a predetermined second movement; and displaying the main screen in the full-screen display when it is determined, during the composite display, that the moving operation is the second movement.

The present invention configured as described above can provide the medium on which is recorded the image displaying program which can achieve the same effect as described above. Of course, the recording medium may be a magnetic recording medium, a magnetooptical recording medium or any recording medium which will hereafter be developed. Furthermore, the invention may be applied to a reproduction stage such as a primary product or a secondary reproduction. Otherwise, the invention may be applied to a case where a communication line is used as a supply method.

Furthermore, the invention may be realized in a case where the invention is partially applied to software and further partially to hardware. The invention may be partially recorded on a recording medium so as to be read suitably as occasion remands.

When realized as software, the invention may be used with hardware or an operating system or may be realized separately from hardware or an operating system. For example, a method of realizing arithmetic processing includes reading data of a predetermined mathematical function from an operating system and inputting the data from hardware without reading the data from an operating system. Actually, even when the invention is realized through the intervention of an operating system, it can be understood that only the program can embody the invention in the process of recording a program on a medium and distributing the program.

Additionally, when put in execution as software, the present invention is realized not only as a medium on which a program is recorded but also as the program itself. Thus, the invention involves a program.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout:

FIG. 3 an exemplary illustration of pieces of information of specified ranges;

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

For purposes of illustration, programs and other executable program components are illustrated herein as discrete blocks, although it is recognized that such programs and components may reside at various times in different storage components, and are executed by the data processor(s) of the computers.
Hardware Configuration Referring to FIG. 1, a hardware configuration of a computer to which the image displaying apparatus of the invention is applied is shown in the form of block diagram. Of course, an image displaying method is carried out in the process of sequential execution of processing by the image displaying apparatus. Accordingly, it is needless to say that the embodiment is premised on the provision of an image displaying program. The program is recorded on a recording medium such as an optical disk or hard disk.

Figure 1:
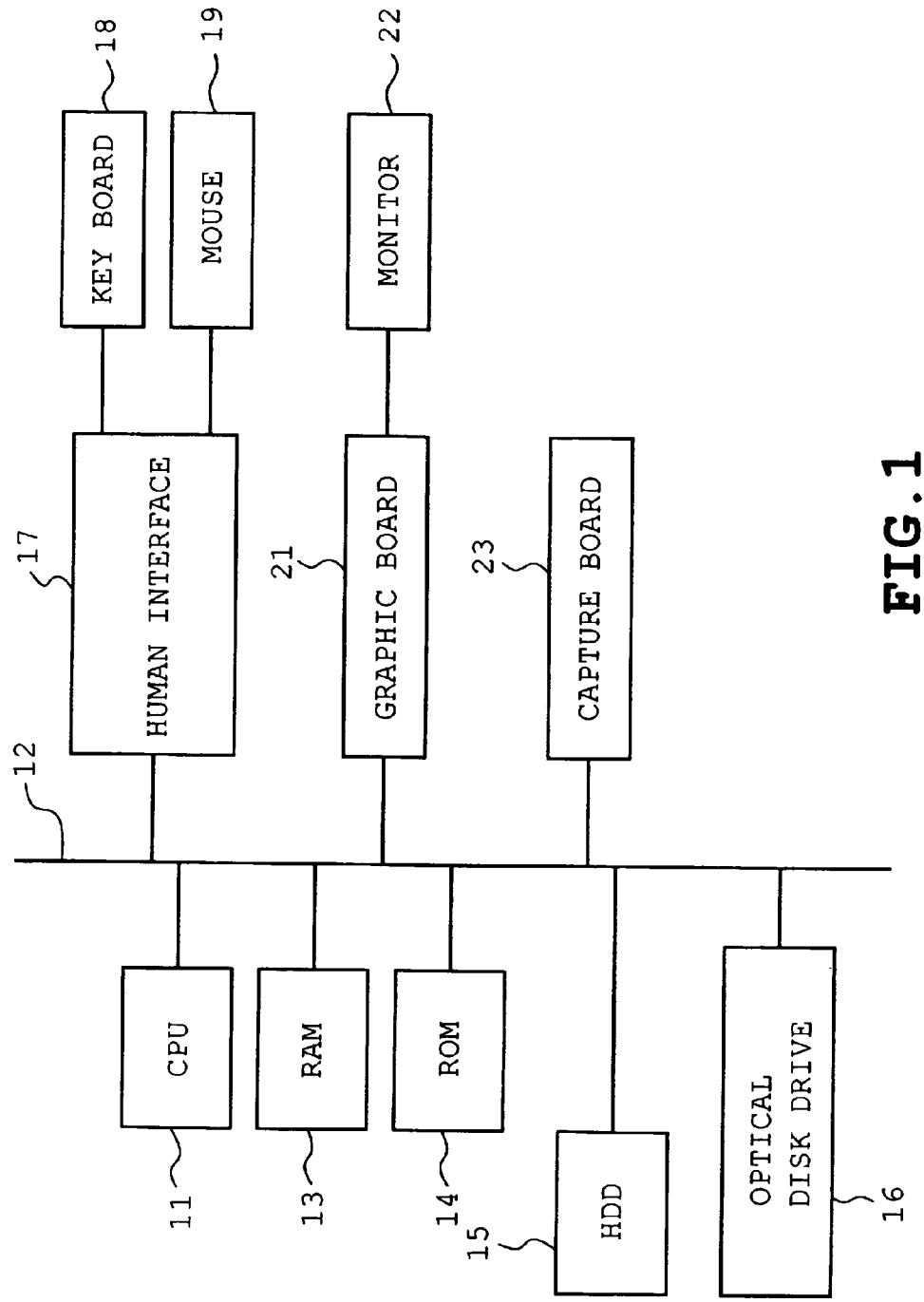
FIG. 1 is an exemplary illustration of a block diagram showing hardware configuration of a computer to which one embodiment of the image displaying apparatus of the present invention is applied.

Referring further to FIG. 1, a central processing unit (CPU) 11 is connected via a bus 12 to a random access memory (RAM) 13 and a read only memory (ROM) 14. Non-volatile memory devices such as a hard disk drive 15 and optical disk drive 16 are also connected to the bus 12. A keyboard 18 and a mouse 19 are connected via a human interface 17 to the computer. The human interface 17 is provided for instructing the computer. A screen generated as the result of computation is displayed via a graphic board 21 on a monitor 22. In the embodiment, a capture board 23 is connected to the bus 12 so that a television screen is generated.

The mouse 19 has a mouse button provided on an upper face thereof. The mouse button can be turned on and off while the mouse 19 detects an amount and a direction of movement. The mouse 19 may be of any type, for example, a ball rotation type, an optical type or the like. The mouse 19 may have one button or a plurality of buttons. A moving operation of the mouse can be interpreted in a broad meaning. Accordingly, the invention is applicable to a tilt operation of a stick type.

The capture board 23 includes a type which is connected to the bus 12 and another type which can realize connection to an external capture board via a universal serial bus (USB) or the like. In the embodiment, the capture board 23 realizes a main screen generating unit which generates a main screen. However, the main screen generating unit should not be limited to the capture board 23. For example, the main screen generating unit may be a real time displaying apparatus which displays real-time stock prices.

The monitor 22 displays a mouse cursor at a location obtained by computation by the CPU 11 in addition to screens generated by an application or operating system. The display of mouse cursor may be generated on the basis of computation by the CPU 11 or may be generated by a hardware circuit to be displayed on an original screen. The display of mouse cursor is generally turned on and off.

The CPU 11 executes an operating system read from a hard disk drive 15 or optical disk drive 16 to further execute various applications and drivers from the operating system. The CPU 11 is capable of realizing various functions by execution of various programs in a software manner. These functions can be realized in a hardware manner as well as in the software manner.

The operating system is capable of executing a full-screen display and a framed display as a screen display mode. No frame is displayed in the full-screen display. Furthermore, no taskbar is displayed even when the mouse cursor is moved to four sides of the screen. In the framed display, a plurality of frame display screens are capable of being superposed in a predetermined order. However, the frame can be non-displayed or hidden, and in this sense, the frame display corresponds to displaying a plurality of display screens at optional locations while the screens are maintained in a relation of superposition. Whether or not the display mode is the full-screen display or the frame display is maintained as a predetermined parameter of the operating system. Accordingly, whether or not the display mode is the full-screen display or the framed display can be determined by the reading of the parameter. Furthermore, the operating system can sequentially make a determination for the operation of the mouse and holds information about the current location of the mouse cursor, the operation of the mouse button and the like as predetermined parameters. As a result, the operating system can make a determination by reading the parameters.

Software Arrangement: Composite Display of Main Screen and Sub-Screen

Figure 2:
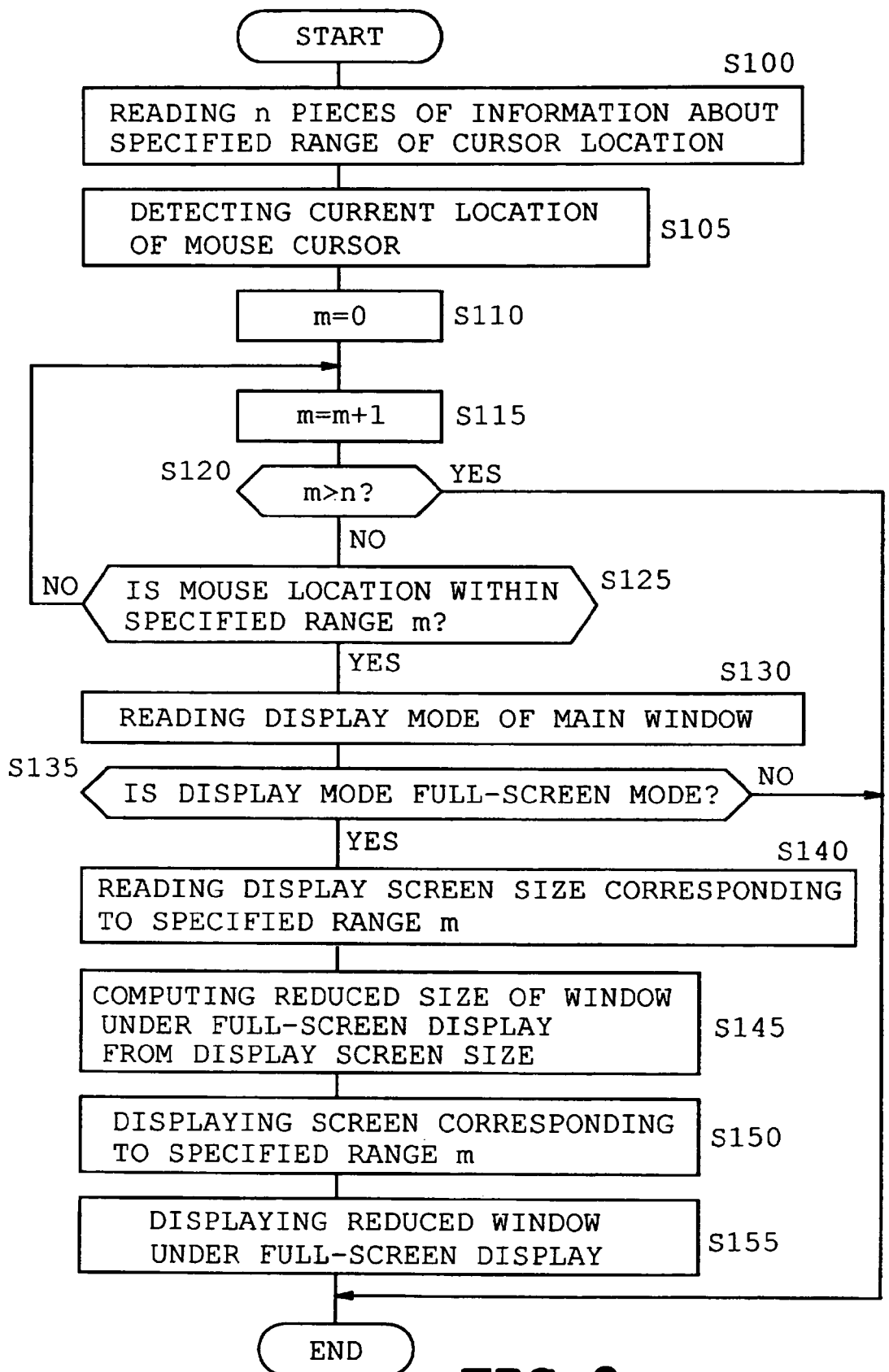
FIG. 2 is an exemplary illustration of a flowchart showing software realizing part of the image displaying apparatus.

Referring now to FIG. 2, software used with the image displaying apparatus is shown in the form of a flowchart. On the premise of execution of the flowchart, it is supposed that the monitor 22 displays a television broadcast on the screen, generated by the capture board 23.

The computer reads n number of pieces of information about specified range of current mouse cursor location at operational act S100 in FIG. 2. In order to determine a moving operation of the mouse according to the current location of the mouse cursor, a plurality of pieces of information about specified locations are prepared as a predetermined range of moving location. As an example, another menu (sub-menu) is displayed on the sub-screen when the mouse is moved so that the image is moved toward one of four sides of the screen. The four ranges are specified as shown in FIG. 3.

The location of the mouse cursor is displayed as X-Y coordinate with an upper left portion of the screen serving as an origin (0, 0). In the example as shown in FIG. 3, the specified range with highest priority specifies a rectangular range with a left upper corner (X10, Y10) and a right lower corner (X11, Y11) serving as opposite angles, and a sub-screen displayed according to the rectangular region is menu 1. For example, when the screen size is represented as 1280× 1024 pixels, a rectangular area from (0, 960) to (1279, 1023) is obtained. Accordingly, when the mouse cursor is moved from the left end of the lower side into an area of 64 pixels extending upward from the lower end, the mouse cursor enters the specified range 1.

In the same way, when the rectangular region with a second highest priority is represented as (1216, 0) to (1279, 1023), the mouse cursor is moved from the upper end of the right side to the lower end into an area of 64 pixels extending leftward from the right end, whereupon the mouse cursor enters the specified range 2.

In the same way, when the rectangular region with a third highest priority is represented as (0, 0) to (1279, 63), the mouse cursor is moved from the left end of the upper side to the right end into an area of 64 pixels extending downward from the upper end, whereupon the mouse cursor enters the specified range 3.

In the same way, when the rectangular region with a fourth highest priority is represented as (0, 0) to (63, 1023), the mouse cursor is moved from the upper end of the left side to the lower end into an area of 64 pixels extending rightward from the left end, whereupon the mouse cursor enters the specified range 4.

Although different menus are allocated to the four sides respectively in the above-described example, a single menu may be allocated to a plurality of sides. Furthermore, a plurality of areas, for example, right and left areas or upper and lower areas, may be allocated to the same side. In this case, rectangular regions corresponding to the respective areas are specified, and priority is determined and is built into a table as shown in FIG. 3. Since the specified ranges are arranged in descending order of priority, only the area with higher priority is effective even when two areas are superposed on each other. For example, when the mouse cursor is moved toward a corner where the lower and right sides are in contact with each other, the mouse cursor is involved in both specified ranges 1 and 2 at the corner. However, since specified range 1 near to the lower side has a higher priority, a downward movement operation is determined with priority. Of course, priority may be canceled and a plurality of menus corresponding to a plurality of specified ranges relevant to the current location of the mouse cursor may be displayed.

As described above, since four specified ranges are read in the embodiment, n at operational act S100 corresponds to 4. The current location of the mouse cursor is detected at operational act S105. The current location is held as parameter by the operating system and accordingly, the detection of the current location of the mouse cursor is realized by referring to the parameter. Variable m is set for 0 at operational act S110 and loop processing from operational act S115 to operational act S125 is prepared. Variable m is incremented by 1 at operational act S115, and it is determined at operational act S120 whether or not the value of variable m is larger than n (a condition for ending the loop). It is determined at operational act S125 whether or not the location of the mouse is within the specified range m until variable m corresponds with n. More specifically, it is determined whether or not the current location of the mouse cursor is within the rectangular region in the range specified by m as shown in FIG. 3. The determination corresponds to mouse operation unit. A final location of the mouse is used for determination of the moving operation in the foregoing embodiment. However, a type of the moving operation may be determined during movement of the mouse using a moving direction and amount of movement of the mouse, instead. More specifically, when a predetermined time contains a non-movement period, a moving direction and amount of movement of the mouse are determined using a current location at the time of start of movement and a current location at the time of termination of movement. It is determined whether or not the moving direction is within a predetermined angle range and further whether or not the amount of movement is larger than a certain amount set as a threshold, whereupon whether or not a predetermined moving operation has been carried out is determined on the basis of the results of the aforesaid determinations.

Of course, the moving operation of the mouse should not be limited to the above-described but an analog quantity such as a tilt angle of a stick may be utilized, instead.

The control sequence gets out of the loop when the current location of the mouse is within one of the specified ranges, and a display mode of a main window is read at operational act S130. The main window has the highest priority of a plurality of screens controlled on the operating system and is displayed on the top of the superposed screens in the framed screen mode. In the case of the full-screen display, only the main window is displayed in the full-screen display. A television screen generated by the capture board 23 is displayed as the main window in the embodiment.

Suppose now that the main window is displayed in the full-screen display. At the following operational act S135, it is determined whether or not the display mode is the full-screen display (corresponding to full-screen display). The case where the determination is made in the affirmative (YES) corresponds to the determination that the movement of the mouse is the predetermined or first movement in the full-screen display. Accordingly, the size of the displayed screen corresponding to the specified range m is read at operational act S140. Now, suppose that the mouse is moved downward so that the current location is within the rectangular area corresponding to specified range 1. Menu 1 corresponds to specified range 1 and has a previously prepared display screen size. Accordingly, the display screen size of menu 1 is read at operational act S140. In the case of menu 1, program list is displayed on a lower part of the screen using the full width from the left end to the right end of the screen while the program list is in contact with the lower end of the screen. As a result, it is determined that the display screen size is represented by the horizontal dimension of 1080 pixels and the vertical dimension of 840 pixels. Of course, display screen size of a menu corresponding to each specified range m is read.

A downscaled size of the window displayed in the full-screen display is computed from the display screen size. When menu 1 is displayed as a sub-screen, the full horizontal dimension is used. Since 682 pixels starting from the lower end of the screen are used for the vertical dimension, a remaining area is represented as 1280×342 pixels. In this case, the main window is represented as 1280×1024 pixels and accordingly, a reduction ratio of 342:1024 regarding the vertical dimension is necessitated in order that the main window may be displayed in its maximum size while being downscaled to the remaining area. More specifically, the horizontal dimension is represented as 1280×342/1024=about 427 pixels when multiplied by 342/1024. As a result, an aspect ratio remains unchanged. Furthermore, a reduced size is obtained to downscale the main window to 427×342 pixels. The downscaled main window is displayed on the central part of the remaining area. The location of the main window is then represented as (1280−427)/2=about 426 pixels. Computation is carried out so that coordinates of the upper left corner are represented as (426, 0). Consequently, margins are uniformly formed on the right and left parts of the main screen. Margins to be formed on upper and lower parts of the main screen are formed in the same manner. More specifically, the coordinates of display location of the main window to be displayed in a downscaled size are computed.

A screen corresponding to specified range m is displayed at operational act S150. More specifically, as shown in FIG. 3, a menu set according to the specified range m within which the mouse cursor is currently located is displayed at a location designated by the display location. When the mouse cursor is within the specified range 1, menu 1 is displayed so as to be in contact with the lower end of the display screen. When the mouse cursor is within the specified range 2, menu 2 is displayed so as to be in contact with the right end of the display screen. When the mouse cursor is within the specified range 3, menu 3 is displayed so as to be in contact with the upper end of the display screen. When the mouse cursor is within the specified range 4, menu 4 is displayed so as to be in contact with the left end of the display screen.

After the sub-screen has been displayed at operational act S150, the window under display in the full-screen display is downscaled to be displayed. More specifically, the main screen is downscaled on the basis of the downscaled size computed at operational act S145 with respect to the main screen displayed as the main window and further on the basis of the display location, being displayed at the display location with the upper left corner serving as the reference location. Prior to display at operational acts S150 and S155, the screen in the full-screen display is blacked out thereby to be erased.

As the result of the above-described processing, the main screen which is a television screen is generated by the capture board 23 (a main screen generating unit, a main screen generating function). When the aforesaid main screen is on display via the operating system on the monitor 22 in the full-screen display (a full-screen displaying unit, a full-screen displaying function), the moving operation of the mouse 19 is detected via the operating system and it is determined whether or not the detected movement is the predetermined or first movement (a mouse operation determining unit, operational acts S100 to S125, a mouse operation determining function). It is then determined whether or not the main screen is in the full-screen display (a full-screen display detecting unit, operational acts S130 and S135, a full-screen display detecting function). When it is determined that the detected movement is the predetermined or first movement, a predetermined sub-screen is displayed and the main screen is downscaled so that the whole main screen can be displayed within a remaining range of the screen (a composite displaying unit, operational acts S140 to S155, a composite displaying function).

Software-Arrangement: Non-Display of Sub-Screen

Figure 4:
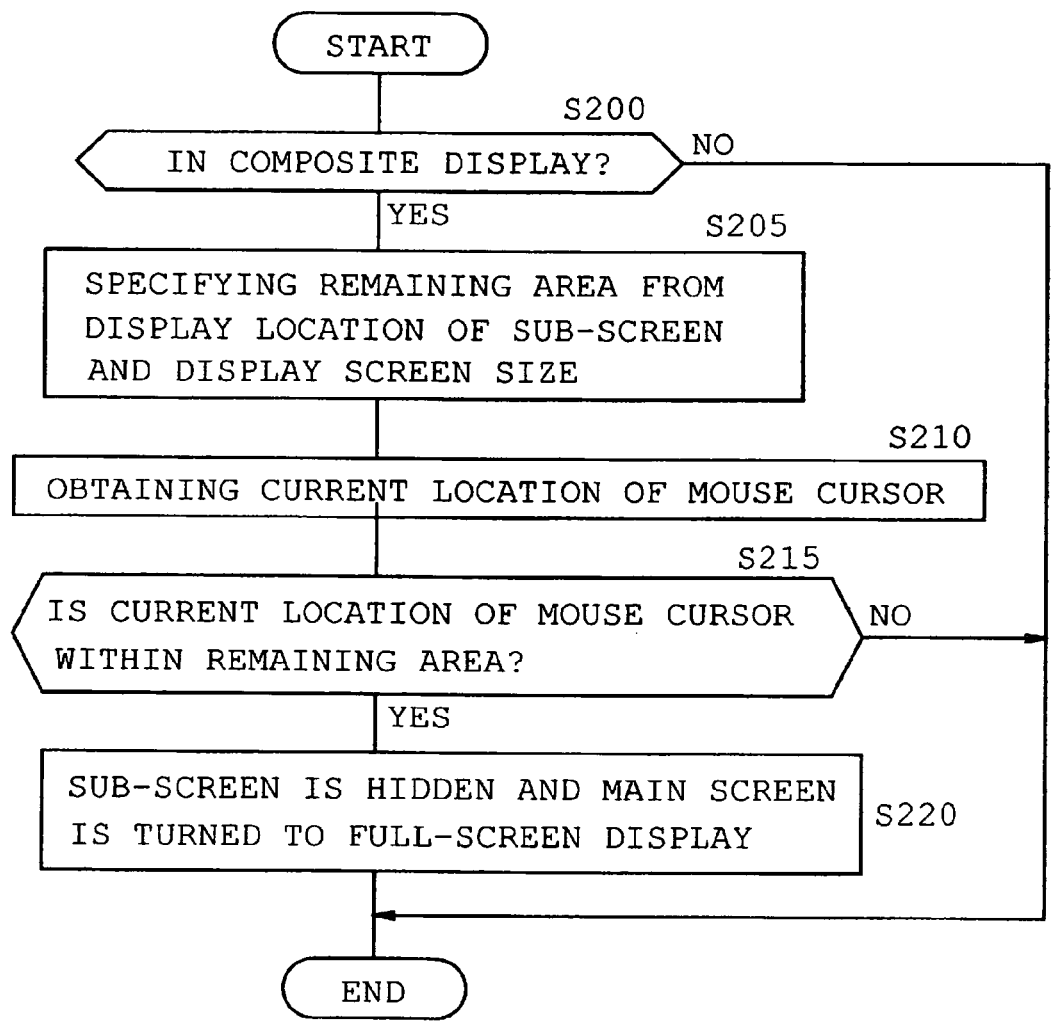
FIG. 4 is an exemplary illustration of a flowchart showing software realizing part of the image displaying apparatus.

FIG. 4 shows software realizing part of the image displaying apparatus. At operational act S200, it is determined whether or not the display is in the composite display mode. The composite display mode refers to a state in which a sub-screen and downscaled main screen are displayed at operational acts S150 and S155. A flag is set at either operational act S150 or S155 and then, the flag is referred to at operational acts S200, whereby the composite display is realized.

During the composite display, a remaining area is specified from the display location and display screen size of the sub-screen at operational acts S205. The main screen is displayed in the downscaled state in the remaining area but the remaining area including parts of the main screen is specified. In the case of the specified range 1, menu 1 serving as the sub-screen is displayed so as to be in contact with the lower end of the screen. Since menu 1 has the vertical dimension of 682 pixels and is adapted to be displayed so as to be in contact with the lower end, the remaining area has a rectangular area represented as (0, 0)-(1279, 342). When having a horizontal dimension of 440 pixels and the sub-screen displayed in a right part of the screen, menu 2 is displayed in contact with the right end of the screen and accordingly has a rectangular area represented as (0, 0)-(839, 1023). The remaining area is thus specified in order that display of the menu on the sub-screen is stopped and the main screen is returned to the full-screen display when the mouse is operated so as to be moved into the remaining area.

A current location of the mouse cursor is obtained from the parameter of the operating system at operational act S210. It is then determined whether or not the current location of the mouse cursor is within the remaining area, at operational act S215. A second movement refers to a moving operation for moving the mouse so that the mouse cursor enters the remaining area. The determination is made at operational act S215. Of course, the moving operation is suitably changeable. For example, a type of the moving operation may be determined using a moving direction and an amount of movement during movement of the mouse.

When determination is made in the affirmative (YES) at operational act S215, the menu on the sub-screen is not displayed and the main screen generated by the capture board 23 is displayed in the full-screen display, at operational act S220.

In the above-described processing, it is determined whether or not the display is in the composite display wherein the above-described sub-screen is displayed as well as the main screen (a composite display detecting unit, operational act S200, a composite display detecting function). Furthermore, the moving operation of the mouse is detected and it is determined whether or not the movement is the predetermined or second movement (another mouse movement determining unit, operational acts S205 to S215, another mouse movement determining function). When it is determined that the movement of the mouse is the above-described second movement, the main screen is displayed in the full-screen display (a full-screen return control unit, operational act S220, a full-screen return controlling function).

Displayed Contents

Figure 5:
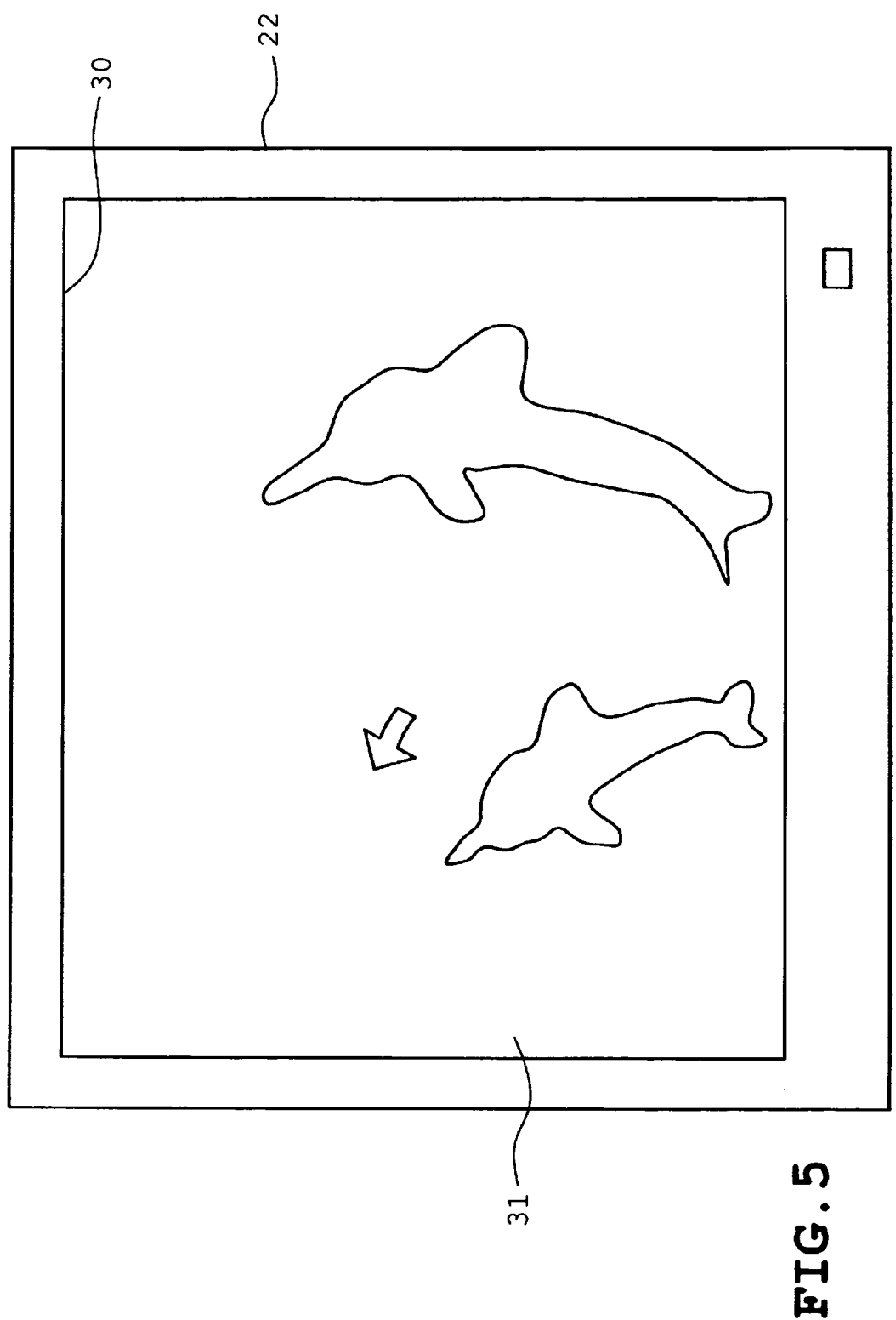
FIG. 5 is an exemplary illustration of a main screen in a full-screen display.

FIG. 5 shows the main screen in the full-screen display. The main screen 31 is displayed with the whole display area 30 of the monitor 22 being used.

Figure 6:
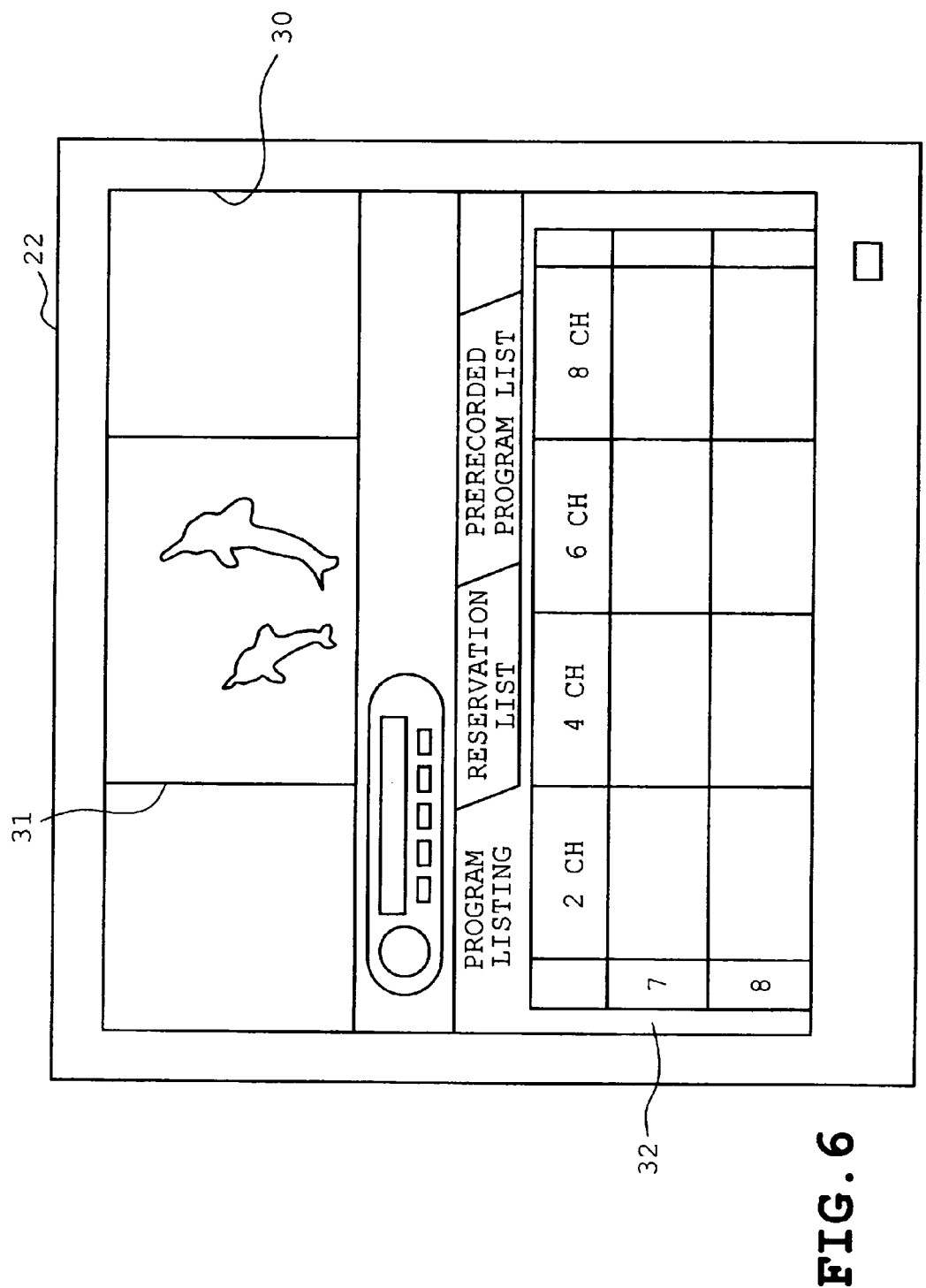
FIG. 6 is an exemplary illustration of a composite displaying state including a main screen and a sub-screen of program list.

FIG. 6 shows menu 1 serving as a sub-screen and displayed when the mouse cursor has been within the area of the specified range 1. The displayed contents are obtained when the mouse is moved so that the mouse cursor is located within a range of 64 pixels from the lower end of the display area 30. Program list 32 serving as a sub-screen is displayed in the range of 682 pixels from the lower end. The sub-screen can selectively display a list of reserved programs or a list of recorded programs in addition to the program list by a tab system. When finding a program to be recorded while the program list is displayed, the mouse button is operated so as to be accepted and data necessary for recording is generated. This operation is referred to as "reserving operation." A tab of the reserved program list is clicked so that data of reserved program whose recording time has not been reached is displayed as a list on a space of the program list. The mouse is operated on the displayed list so that reservation is canceled or changed. Recorded programs are displayed in the form of a list when a tab for a list of recorded programs clicked. Furthermore, the mouse is operated so that recorded contents are reproduced or deleted.

Figure 7:
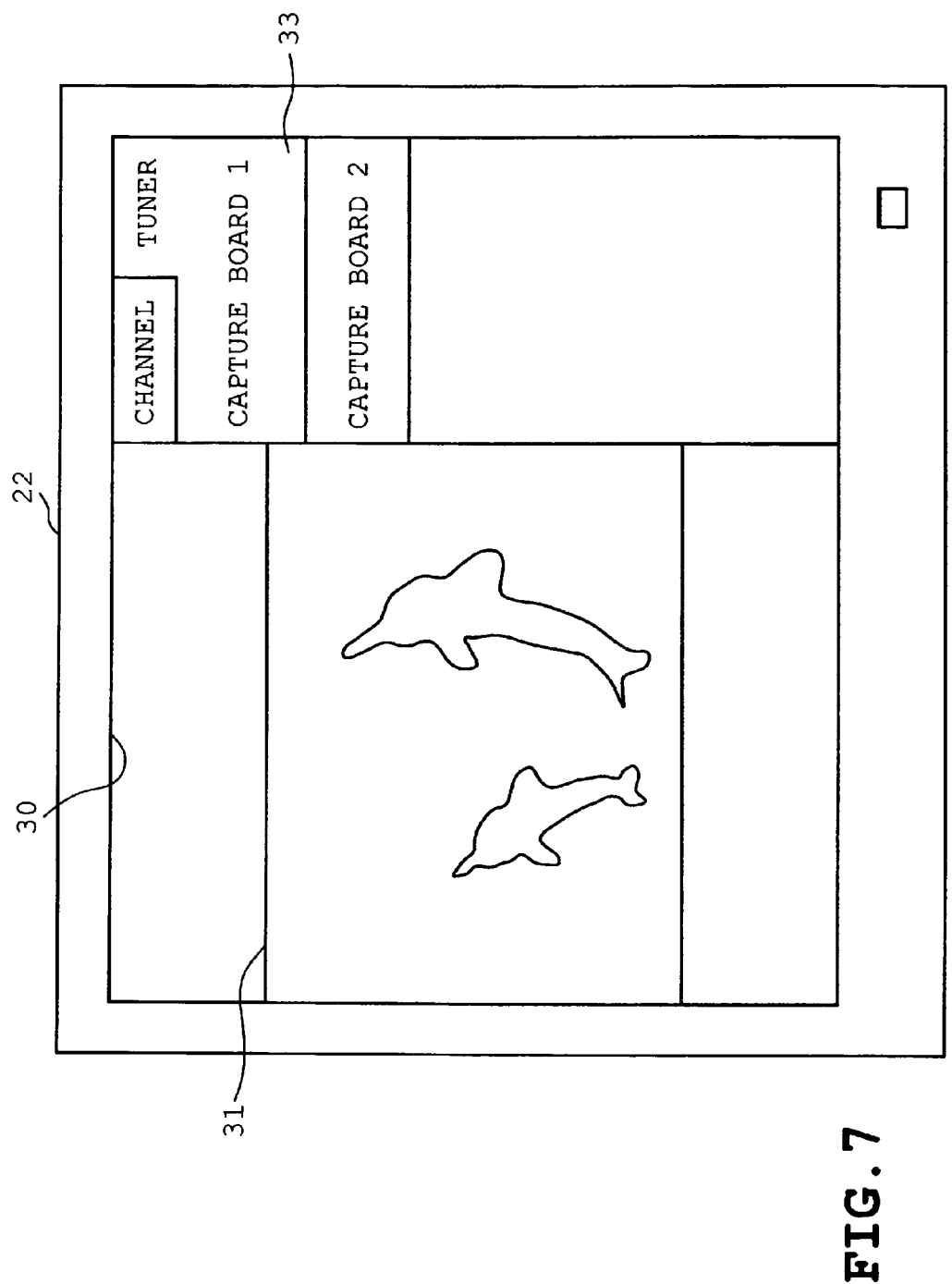
FIG. 7 is an exemplary illustration of a composite displaying state including a main screen and a sub-screen of tuner setting.

FIG. 7 shows menu 2 serving as the sub-screen and displayed when the mouse cursor is located within the area of specified range 2. These displayed contents are obtained when the mouse is moved so that the mouse cursor is moved into a range of 64 pixels from the right side of the display area 30. A tuner setting screen 33 serving as a sub-screen is displayed in the range of 440 pixels from the right end. This sub-screen can selectively display the tuner setting screen or channel display by the tab system. The setting screen is provided for executing setting necessitated for each capture board 23. When the mouse button is operated for entry field of a capture board (displayed as tuner) to be set, necessary setting operations are carried out and accepted. This operation is referred to as "setting screen operation." Channels which are currently on-air and receivable are displayed as a list on a display space of the setting screen when tabs of these channels are clicked. The mouse is operated on the list so that the display is switched to the channel.

Figure 8:
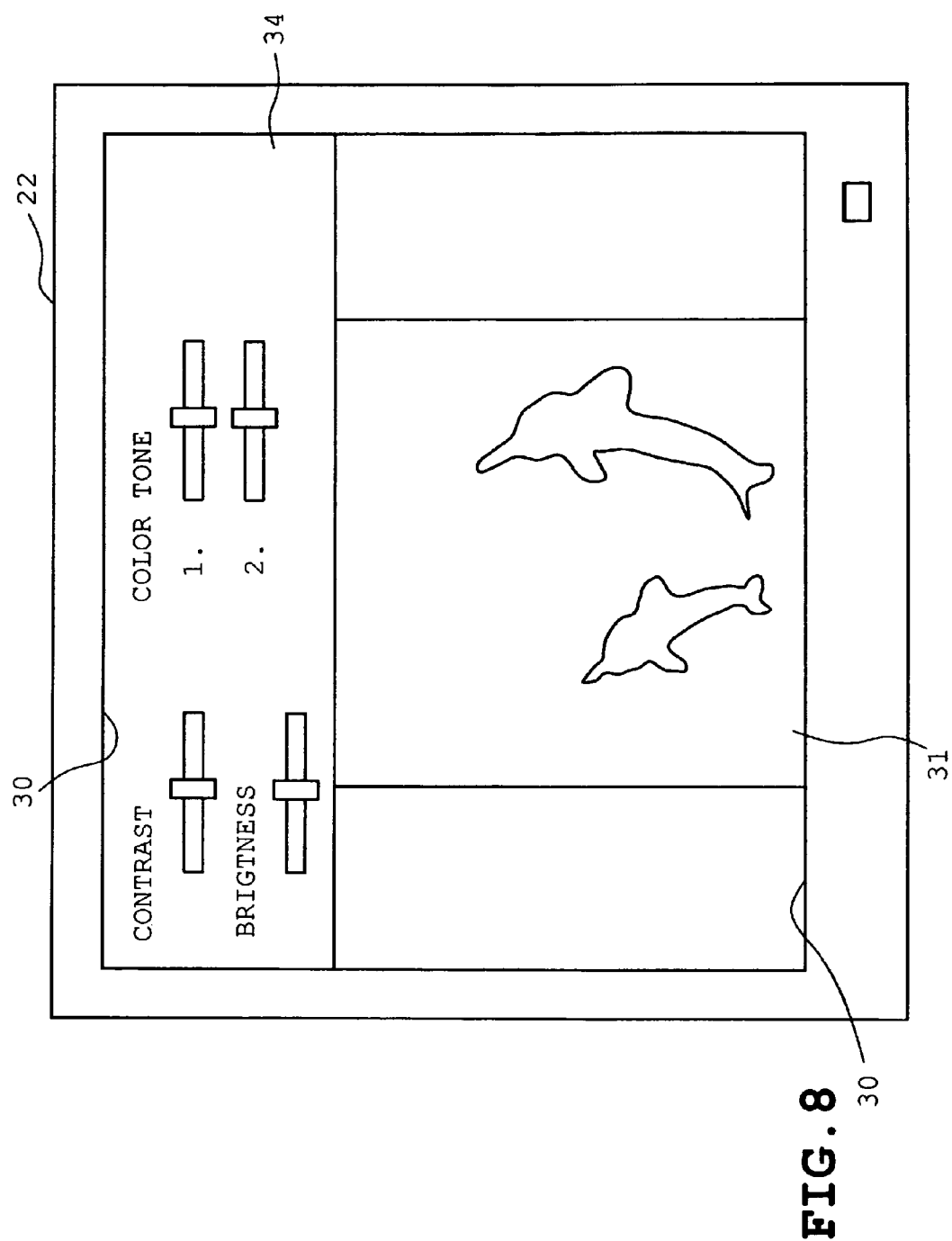
FIG. 8 is an exemplary illustration of a composite displaying state including a main screen and a sub-screen of color tone adjustment for a tuner.

FIG. 8 shows menu 3 serving as a sub-screen and displayed when the mouse cursor is in the area of the specified range 3. This display is obtained when the mouse is moved so that the mouse cursor is moved into a range of 64 pixels from the upper side of the display area 30. A sub-screen of color tone adjustment for a tuner is displayed in the range of 341 pixels from the upper end. On the sub-screen, slide bars are moved so that contrast, brightness, color tone 1 and color tone 2 are adjustable respectively, and these operations (color tone adjusting operations) are accepted. A tuner (the capture board 23) which is an object of the color tone adjustment is currently displayed on the main screen.

Figure 9:
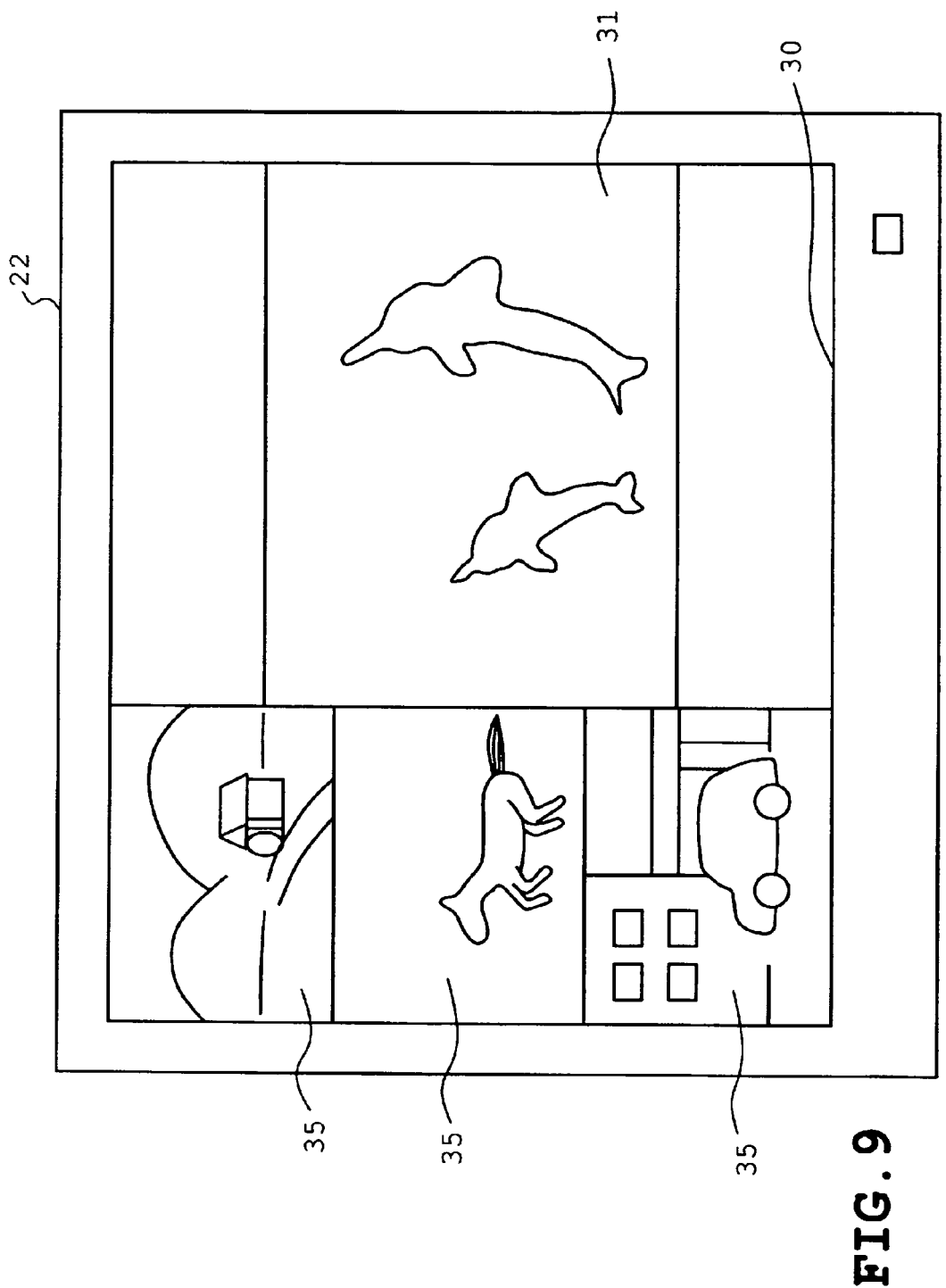
FIG. 9 is an exemplary illustration of a composite displaying state including a main screen and a sub-screen of still image.

FIG. 9 shows a sub-screen displayed when the mouse cursor is within the area of the specified range 4. This display is obtained when the mouse is operated so that the mouse cursor is moved into a range of 64 pixels from the left side of the display area 30. Still images of television received by a plurality of capture boards 23 respectively are displayed on a sub-screen in the range of 440 pixels from the left end. The display screen of the still images serves as a still image screen 35. Of course, the capture boards 23 other than the capture board 23 generating the main screen are displayed on the sub-screen. The still image is used for the purpose of reducing processing load. The still image is recaptured in the intervals of several seconds, and the capture board 23 serving as the main screen is changed so that the capture board of the sub-screen becomes the main screen when the television program reaches an anxious scene while the channel on the main screen is mainly viewed.

According to the above-described image displaying apparatus, the main screen which is a television screen is generated by the capture board 23 (the main screen generating unit). While the main screen is being displayed via the operating system by the monitor 22 in the full-screen display (the full-screen displaying unit), the moving operation of the mouse 19 is detected via the operating system, so that it is determined whether or not the moving operation of the mouse 19 is the predetermined first movement (the first mouse operation determining unit, operational acts S100 to S125). Furthermore, it is determined whether or not the main screen is in the full-screen display mode (the full-screen display detecting unit, operational acts S130 and S135). When it is determined during the full-screen display that the moving operation of the mouse 19 is the predetermined first movement, the predetermined sub-screen is displayed on the screen, and the main screen is downscaled so that the whole main screen is displayed within the remaining range of the screen (the composite displaying unit, steps S140 to S155).

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

In addition, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of," "act of," "operation of," or "operational act of" in the claims herein is not intended to invoke the provisions of 35 U.S.C. 112, Paragraph 6.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. An image displaying apparatus for a computer that is capable of accepting an operation of a mouse and selectively executing one of a full-screen display and a frame display on a screen of a monitor, the apparatus comprising:
   a main screen generating unit that generates a predetermined image on the screen;
   a full-screen displaying unit that displays the image in the full-screen display;

a first mouse operation determining unit that detects a moving operation of the mouse to determine whether the moving operation is a predetermined first movement;

a full-screen display detecting unit that detects whether the image on the screen is in the full-screen display; and a composite displaying unit that displays a predetermined sub-screen on the screen and the main screen that is downscaled so that the entire main screen is displayed on the remaining portion of the screen when the first mouse operation determining unit determines, during the full-screen display, that the moving operation is the first movement.

2. The apparatus according to claim 1, wherein the composite displaying unit further includes:

a composite display detecting unit that detects whether the sub-screen is under a composite display in addition to the main screen;

a second mouse operation determining unit that detects a moving operation of the mouse to determine whether the moving operation is a predetermined second movement; and a full-screen return control unit that controls the full-screen display detecting unit so that the main screen is displayed in the full screen display when the second mouse operation determining unit determines, during the composite display, that the moving operation is the second movement.

3. The apparatus according to claim 2, wherein each mouse operation determining unit has an obtaining unit that obtains a predetermined plurality of pieces of location information and a current location of a mouse cursor with a moving operation of the mouse, thereby determining whether the obtained current location of the mouse cursor corresponds with each location information.

4. The apparatus according to claim 1, wherein the screen has four sides and the moving operation of the mouse is a movement of the mouse to a location near to any one of the four sides of the screen.

5. The apparatus according to claim 4, wherein when the first movement is a movement near to a location where two of the four sides of the screen are in contact with each other, priority is given to either one of the two of the four sides.

6. The apparatus according to claim 4, wherein the composite displaying unit displays other sub-screens corresponding to the four sides of the screen.

7. The apparatus according to claim 1, wherein the composite displaying unit displays the sub-screen at a location near to any one of the four sides of the screen, detects a length and a breadth of a remaining area and computes a reduced size that can display largest while an aspect ratio of the main screen remains unchanged and displays the remaining area with a reduced size as large as possible, displaying the screen with the reduced size with right, left, upper and lower remaining parts being substantially uniformed.

8. The apparatus according to claim 1, wherein the main screen generating unit receives television broadcast to generate a television broadcast screen.

9. The apparatus according to claim 8, wherein the composite displaying unit generates a sub-menu screen concerning watching of the television broadcast as the sub-screen.

10. The apparatus according to claim 9, wherein the sub-menu displays a television program list and accepts a video recording reservation.

11. The apparatus according to claim 10, wherein the first movement is a downward movement of the screen and the sub-menu is displayed on a lower part of the screen.

12. The apparatus according to claim 8, wherein the main screen generating unit comprises a plurality of capture boards individually receiving television broadcast.

13. The apparatus according to claim 12, wherein the sub-menu displays information about the capture boards and accepts a setting operation of each capture board.

14. The apparatus according to claim 13, wherein the first movement is a rightward movement of the screen and the sub-menu is displayed on a right part of the screen.

15. The apparatus according to claim 12, wherein the sub-menu displays a still image of television broadcast received by each of a plurality of capture boards.

16. The apparatus according to claim 15, wherein the first movement is a leftward movement of the screen and the sub-menu is displayed on a left part of the screen.

17. The apparatus according to claim 15, wherein the sub-menu is capable of accepting a color tone adjusting operation of the main screen.

18. The apparatus according to claim 17, wherein the first movement is an upward movement with respect to the screen and the sub-menu is displayed on an upper part of the screen.

19. An image displaying method for a computer that is capable of accepting an operation of a mouse and selectively executing one of a full-screen display and a frame display on a screen of a monitor, the method comprising:

generating a predetermined main screen;

displaying the main screen in a full-screen display;

detecting a moving operation of the mouse to determine whether the moving operation is a predetermined first movement;

detecting whether the main screen is in the full-screen display; and displaying a predetermined sub-screen on the screen and the main screen which is downscaled so that the entire main screen is displayed on the remaining range of the screen when it is determined, during the full-screen display, that the moving operation is the first movement.

20. The method according to claim 19, further comprising:

detecting whether the sub-screen is in a composite display mode in addition to the main screen;

detecting a moving operation of the mouse to determine whether the moving operation is a predetermined second movement; and displaying the main screen in the full-screen display when it is determined, during the composite display, that the moving operation is the second movement.

21. A computer program product for selectively executing a full screen display or a frame display on a screen of a monitor, the computer program product comprising a computer-readable medium having computer program instructions stored therein for causing a computer, which is capable of accepting an operation of a mouse, to perform operations of:

generating a predetermined main screen;

displaying the main screen in the full-screen display;

detecting a moving operation of the mouse to determine whether the moving operation is a predetermined first movement;

detecting whether the main screen is in the full-screen display; and displaying a predetermined sub-screen on the screen and the main screen that is downscaled so that the entire main screen is displayed on the remaining range of the screen when it is determined, during the full-screen display, that the moving operation is the first movement.

22. The computer program product according to claim 21, wherein the program further comprises the functions of:

detecting whether the sub-screen is in a composite display in addition to the main screen;

detecting a moving operation of the mouse to determine whether the moving operation is a predetermined second movement; and displaying the main screen in the full-screen display when it is determined, during the composite display, that the moving operation is the second movement.

\* \* \* \* \*